(12) United States Patent
Nalliah et al.

(10) Patent No.: US 7,591,008 B2
(45) Date of Patent: Sep. 15, 2009

(54) CLIENT AUTHENTICATION USING MULTIPLE USER CERTIFICATES

(75) Inventors: Selvaraj Nalliah, Redmond, WA (US); Andrew S. Moss, Kirkland, WA (US); David P. Limont, Seattle, WA (US); Gregory A. Bolles, Snohomish, WA (US); John Allen Atwood, Duvall, WA (US); Massimiliano Ciccotosto, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 11/171,771

(22) Filed: Jun. 30, 2005

(65) Prior Publication Data
US 2007/0005965 A1   Jan. 4, 2007

(51) Int. Cl.
*G06F 15/16* (2006.01)
*H04L 9/32* (2006.01)

(52) U.S. Cl. .................. 726/10; 713/156; 713/157; 709/229

(58) Field of Classification Search .............. 726/10; 713/156–158, 175; 709/229
See application file for complete search history.

(56) References Cited

U.S. PATENT DOCUMENTS

| | | | | |
|---|---|---|---|---|
| 6,301,658 B1 * | 10/2001 | Koehler | ................ | 713/155 |
| 6,550,012 B1 * | 4/2003 | Villa et al. | ............... | 726/11 |
| 6,826,685 B1 * | 11/2004 | Douglas | ................ | 713/168 |
| 6,993,653 B1 * | 1/2006 | Guski et al. | .............. | 713/157 |
| 7,110,745 B1 * | 9/2006 | Smith et al. | .............. | 455/411 |
| 7,350,229 B1 * | 3/2008 | Lander | ...................... | 726/8 |
| 2003/0084104 A1 * | 5/2003 | Salem et al. | ............. | 709/205 |

\* cited by examiner

*Primary Examiner*—Minh Dieu Nguyen
(74) *Attorney, Agent, or Firm*—Workman Nydegger

(57) ABSTRACT

Example embodiments provide for authenticating a device to multiple servers without using delegation or having to have a password stored on the device. Multiple certificates that are typically non-delegable are used to authenticate the device to each server. One certificate is used to authenticate the client with the front-end server and a second certificate is used to authenticate the client against a back-end server. Rather than having both certificates reside with the device, however, the second certificate is originally stored by the client in the back-end. It is then retrieved "on-the-fly" by the front-end upon authentication of the client and used to authenticate itself as the client in order to act on behalf of the client when retrieving data from the back-end server.

18 Claims, 3 Drawing Sheets

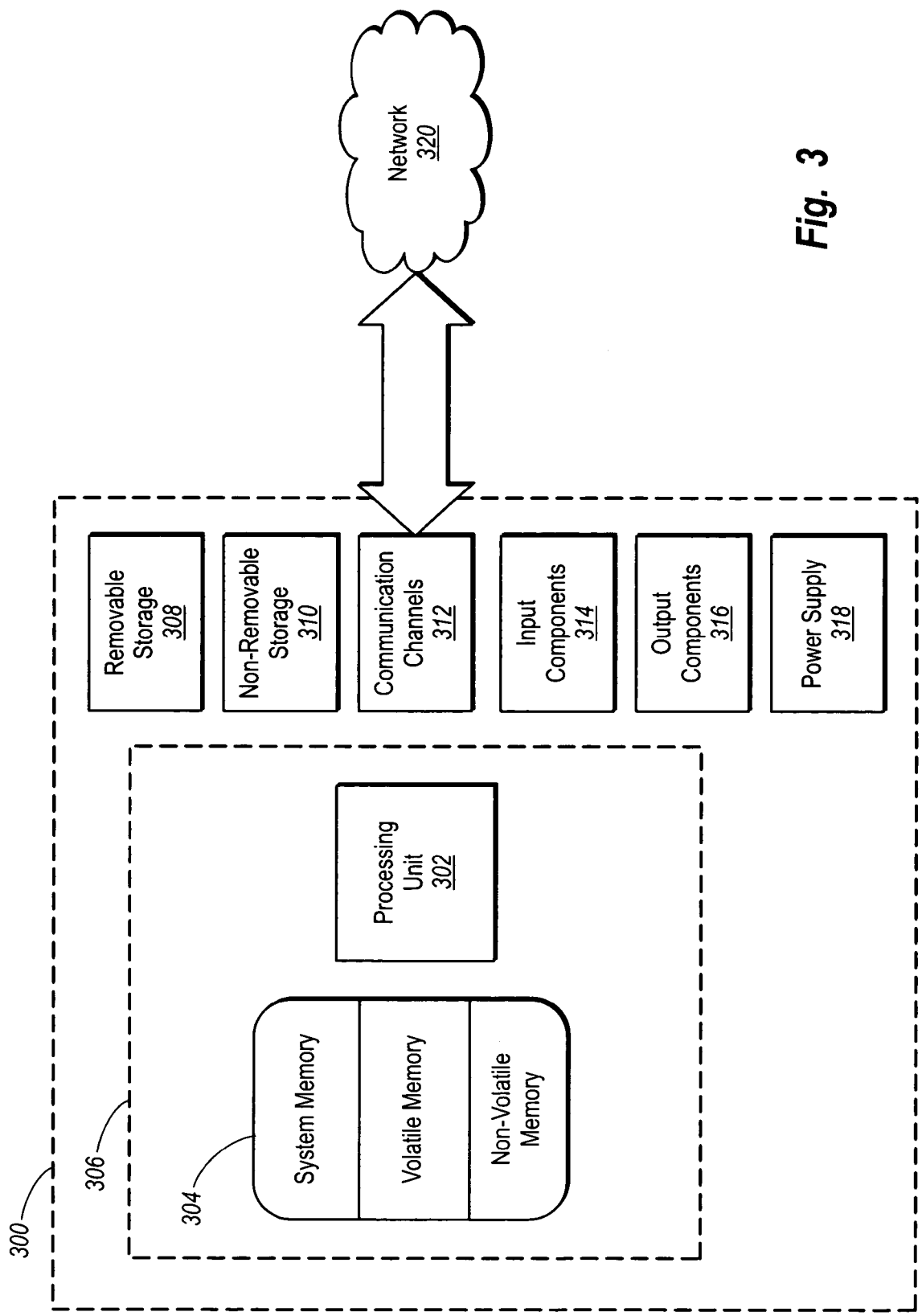

CLIENT AUTHENTICATION USING MULTIPLE USER CERTIFICATES

CROSS-REFERENCE TO RELATED APPLICATIONS

N/A

BACKGROUND

Computerized systems provide many advantages towards peoples' ability to perform tasks. Indeed, the computer system's ability to process information has transformed the way we live and work. Computer systems now commonly perform a host of tasks (e.g., word processing, scheduling, database management, etc.) that prior to the advent of computer systems were preformed manually.

Computing systems now take a wide variety of forms including desktop computers, laptop computers, tablet PCs, Personal Digital Assistance (PDAs), and the like. Even household devices (such as refrigerators, ovens, sewing machines, security systems, and the like) have varying levels of processing capability; and thus may be considered computing systems. Processing capabilities continue to be incorporated into devices that traditionally did not have such processing power. Accordingly, the diversity trend of computing systems will likely increase.

Even more recently different computing systems have been coupled together to form computer networks over which the computer systems can communicate electronically to share data. As a result, many of the tasks preformed at a computer system (e.g., accessing electronic mail, web browsing, etc.) include electronic communication with one or more other systems via a computer network (e.g., the Internet).

Often, electronic communication on a computer network includes a client computer system (hereinafter referred to as a "client" or "device") requesting access to a service (e.g., electronic mail or a web server) at a server computing system (hereinafter referred to as a "server" or "service"). Before granting the client access to the service, the server may issue a challenge to the client requiring the client to prove its identity to the server. Such authentication processes are typically preformed using a basic scheme, which requires the user credentials, e.g., username and password, to be presented to the server. Once authenticated, the user is given authorization, which allows the user access to various resources based on the user's identity.

Although credentials such as a username and password allow for a relatively simple challenge, there are several security risks that have emerged with such authentication. For example, when the username and password go over the wire, if they are not encrypted, hacks or other rogue clients may gain access to the credentials and use them in malicious ways. Further, these credentials are delegable by default, which means that once the client authenticates through one server, the client typically has access to all servers within the network. In addition, these credentials are typically stored on the device so that user does not to have to continually remember a multitude of usernames and passwords. This, however, represents a big security issue for devices that can easily be lost and/or stolen (e.g., PDAs, cellular phones, laptop computers, etc.).

In order to overcome some of the disadvantageous of password credentials, public key infrastructures have been developed. These systems enable users of basically unsecured public networks such as the Internet to securely and privately exchange data through the use of a public and private cryptographic key pair that is obtained and shared through a trusted authority. The public/private key pair infrastructure also provides for digital certificates that can identify an individual or an organization and directory services that can store and, when necessary, revoke the certificate.

Typically, a public key infrastructure consists of: (1) a Certificate Authority (CA) that issues and verifies digital certificates, which includes the public key or information about he public key; (2) a Registration Authority (RA) that acts as the verifier for the certificate authority before a digital certificate is issued to a requester; (3) one or more directories where the certificates (with their public keys) are held; and (4) a certificate management system. Of course, other topologies for public key infrastructures are also available, but the aforementioned entities are some of the basic building blocks used in most systems.

In public key cryptography, a public and private key are created simultaneously by a CA using an algorithm. The private key is given only to the requesting party and the public key is made publicly available (as part of a digital certificate) in a directory that all parties can access. The private key is never shared with anyone or sent across the Internet. For privacy purposes, a client can use the private key to decrypted text that has been encrypted with its public key by another computing device that has access to the public key through a public directory.

A client can also use the public/private key infrastructure to authenticate itself to a server using a similar challenge and response previously described with regard to username and password. In this instance, however, a server can create and store a random blob of data, which it then provides to the client as part of the challenge. The client uses its private key to encrypt the blob of data, which it returns to the server. A CA then decrypts the blob and compares it to the original data. If they match, the client is authenticated and allowed access to the service in accordance with its authorization.

Although digital certificates have become a primary means for encryption and authentication, due to infrastructure topology changes there have emerged several shortcomings and downfalls with using them. For example, more and more networks are using front-end servers to provide most of the functionality for accessing services such as email, while back-end servers are used to simply store the data. As such, the front-end service acts as a load balancing device for the back-end such that there can be several front-end services acting on behalf of a host of clients, yet only a single back-end server is used to access and store data for all of the clients. Note, however, that a client must now authenticate themselves to both servers in order to gain access to each one.

When a username and password is used as credentials, this topology does not pose a problem since, as previously mentioned, such credentials are delegable by default. Digital certificates, on the other hand, are non-delegable by default since each challenge from each server will be different, i.e., different data blobs are encrypted. In an attempt to rectify this and other deficiencies, some systems provide for a general delegation that allows the client to authenticate using a certificate at one server and then allow access to all other servers within the network. As can be seen, however, this posses another security risk and has some of the same shortcomings of a password, i.e., it allows full access to the network. Accordingly, the same concerns arise for mobile device that use certificates in a general delegation infrastructure.

To combat the concerns of general delegation, another topology has emerged known as constrained delegation. In this infrastructure, delegation is limited to a predefined set of servers within the network. Although this a great improvement over general delegation systems, constrained delegation topologies also have there shortcomings. For example, these infrastructures are very complex and require a high degree of skill to appropriately configure. Further, many systems require use of the same versioning of software and/or hardware for each of the servers within the network. Commonly, however, systems have mixed configurations, and thus will not be able to use constrained delegation. In addition, constrained delegation requires a two-way trust between the delegable servers. Accordingly, resource forests with only a one-way trust cannot take advantage of this feature.

SUMMARY

The above-identified identified deficiencies and drawbacks of systems that use multiple servers for load balancing purposes are overcome through exemplary embodiments of the present invention. Please note that the summary is provided to introduce a selection of concepts in a simplified form that are further described below in the detailed description. This summary, however, is not intended to identify key or essential features of the claimed subject matter, nor is it intended to be used as an aid in determining the scope of the claimed subject matter.

In one embodiment, methods, systems, and computer program products are provided for authenticating a device to multiple servers without using delegation or having to have a password stored on the device by using multiple certificates that are typically non-delegable. In this embodiment, a first certificate is received from a client for authenticating the device to a font-end server. Upon authenticating the client to the front-end server, a second certificate is requested from a back-end server in order to access data on behalf of the device. Upon receiving the second certificate, the second certificate is then sent back to the back-end server to authenticate the front-end server as the client. Upon authenticating the front-end server as the client to the back-end server, a request is sent for the data on the back-end server in order to allow the client access to the data on the back-end server via the front-end server.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example computing system that provides a suitable operating environment for implementing various features of the present invention.

DETAILED DESCRIPTION

Figure 1:
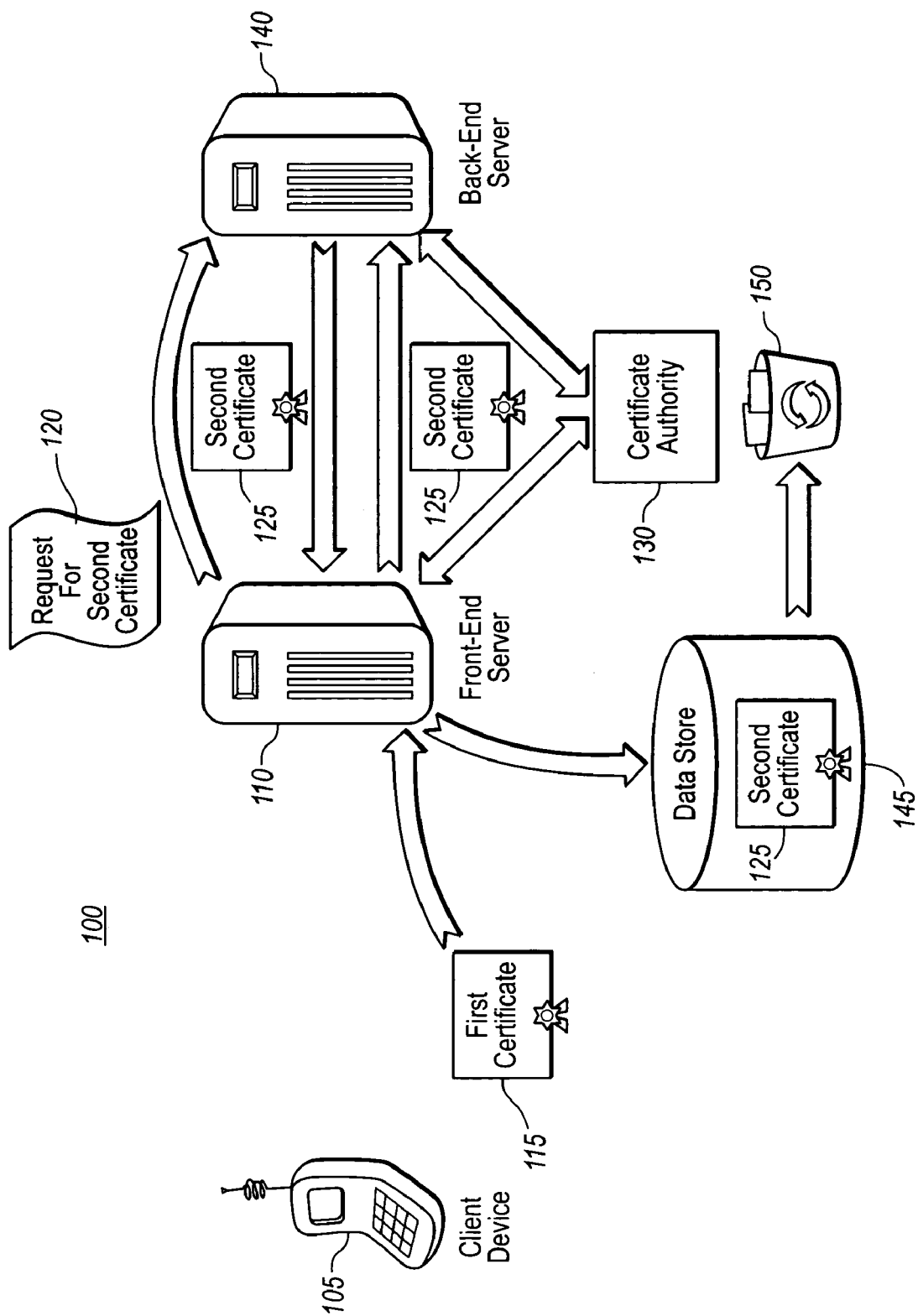
FIG. 1 illustrates a distributed system that uses multiple certificates to authenticate a client device to a back-end server in accordance with example embodiments.

The present invention extends to methods, systems, and computer program products for authenticating a device to multiple servers without using delegation or having to have a password stored on the device. The embodiments of the present invention may comprise a special purpose or general-purpose computer including various computer hardware or modules, as discussed in greater detail below.

Exemplary embodiments address the aforementioned limitations of password credentials and the use of general or constrained delegation topologies by using at least two certificates instead of just one. The first certificate is used to authenticate the client with the front-end server and the second certificate is used to authenticate the client against the back-end server. Rather than having both certificates reside with the device, however, the second certificate is originally stored by the client in the back-end (e.g., in the user's mailbox) and is retrieved "on-the-fly" by the front-end upon authentication of the client. The front-end server will typically access the second certificate using an administrative logon process. It then can perform a mapping between the client authenticated against the front-end and the second certificate retrieved by the back-end in order to allow the client access to data on the back-end via the front-end server. In other words, the front-end server uses the second certificate to authenticate itself as the client in order to act on behalf of the client when retrieving data from the back-end server.

Prior to describing further details for various embodiments of the present invention, a suitable computing architecture that may be used to implement the principles of the present invention will be described with respect to FIG. 3. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

FIG. 3 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 3.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 300 typically includes at least one processing unit 302 and memory 304. The memory 304 may be volatile (such as RAM), non-volatile (such as ROM, flash memory, etc.), or some combination of the two. This most basic configuration is illustrated in FIG. 1 by the dashed line 106. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 3 by removable storage 108 and non-removable storage 310. Computer-storage media include volatile and non-volatile, removable and non-removable media implemented in any method or technology for storage of information such as computer-readable instructions, data structures, program modules, or other data. Memory 304, removable storage 308, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modulates running on a computing system.

Computing system 300 may also contain communication channels 312 that allow the host to communicate with other systems and devices over, for example, network 320. Communication channels 312 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 300 may also have input components 314 such as a keyboard, mouse, pen, a voice-input component, a touch-input device, and so forth. Output components 316 include screen displays, speakers, printer, etc., and rendering modules (often called "adapters") for driving them. The computing system 300 has a power supply 318. All these components are well known in the art and need not be discussed at length here.

FIG. 1 illustrates a distributed system 100 configured to authenticate a client against a back-end server via front-end server using two certificates. The computing or distributed system 100 may be similar to the computing system 300 described above with respect to FIG. 3, although that need not be the case. As shown, the client or client device 105 authenticates to the front-end server 110 by passing up a first certificate 115. The process on the front-end server may pass the first certificate 115 to the certificate authority 130 for validation.

Note that although a certificate authority 130 is shown as a separate module from the front-end server 110, such configuration may not always be the case. For example, the front-end server may be able to provide its own challenge technique such that the certificate authority 130 may be considered as residing on the front-end server 110. Of course, other well known ways of authenticating a device 105 using a certificate are also available to the present invention. As such any particular description or topology that uses certificates when authenticating a client or device is used herein for illustrative purposes only and is not meant to limit or otherwise narrow the scope of the present invention unless explicitly claimed.

Regardless of who verifies the validity for certificate 115, either the certificate authority 130 or the front-end server 110 then maps the first certificate 115 and then sends/generates (depending upon where the authentication occurred) an appropriate authentication token for use in locating the second certificate 125. In other words, a handler from the front-end server 110 can use the token and locate the appropriate data storage for the second certificate 125 on the back-end server. In one embodiment, in the case of email service, the second certificate 125 can be stored in the user's or client's 105's mailbox. As such, the handle uses the token and locates the mailbox for the client 105. Note, however, that the example embodiments may extend beyond email services. In fact, any system that utilizes multiple servers for such things as load balancing can utilize features described herein. Accordingly, the use of the mailbox for storing the second certificate is used for illustrative purposes only and is not meant to limit or otherwise narrow the scope of the present invention unless explicitly claimed.

Regardless of where the second certificate 125 is stored on the back-end server 140, as previously mentioned, the front-end server 110 uses the token to locate and request 120 the second certificate 125 from the back-end server 140. Typically, the front-end server 110 will logon to the back-end server using an administrative login procedure to request 120 the second certificate 125. Upon receiving the request 120 for the second certificate, the back-end server 140 can process and return the second certificate 125 back to the front-end server 110. The front-end server 110 now uses the second certificate 125 to authenticate itself to the back-end server as the client 105 in order to make appropriate data retrieval requests.

Note that the front-end server 110, although having access to the back-end server 140 through, e.g., an administrative logon, would not want to act on behalf of the client 105 in such capacity since the authorizations for an administrative login are typically quite different from those available to client 105. As such, once the second certificate 125 is received from the front-end server 110, the server 110 closes the administrative connection and now attempts to use the second certificate 125 to act on behalf of the client for retrieving data from the back-end server 140.

Once the back-end server 140 receives the second certificate 125 the second certificate 125 may be sent to the certificate authority 130 for validation—or may be authenticate by the back-end server 140 itself. In any event, once the certificate authority 130 or back-end server 140 verifies the authenticity of the second certificate 125 and maps it to the client 105 account, an appropriate authentication token is generated and passed to the process on the back-end server 140. The client 105 can then access the appropriate data stored on the back-end 140 via the front-end server 110.

It should be noted that the first and second certificates 115, 125 may be anyone of well known types, for example, Kerberos, X.509, etc. Note also, that the first and second certificates 115, 125 would typically only be valid for a predetermined period of time, e.g., a week. Accordingly, these certificates 115, 125 continually need to be updated on both the client 105 and the back-end server 140. How these certificates 115,125 are obtained and stored on the client 105 and back-end server 140, however, are not germane to the embodiments of the present invention.

Note that the above described process for authenticating client 105 to the back-end server 140 has some latency issues due to retrieval and authenticating of the additional certificate 125. Accordingly, other example embodiments allow the front-end server 110 to store or cache the second certificate 125 in data store 145, and map the second certificate 125 to the client 105. Accordingly, the next time the client 105 wishes to sync information from the back-end server 140 the front-end server 110 can automatically retrieve a second certificate 125 from the cache without having to request a new certificate from the back-end server 140 via, e.g., an administrative process.

Note, however, that because the second certificate 125 will typically be valid for only a predetermined period of time, when the second certificate 125 expires it will no longer be useful when retrieved from the cache 145. As such, other exemplary embodiments provide for identifying the time period that the second certificate 125 is valid for. Upon expiration of such time period, the front-end server 110 may delete 150 the second certificate 125 and automatically request an updated second certificate 125 from the back-end server 140 as previously described. This updated second certificate 125 may then be mapped to the client 105 and stored in the cache 145 and used upon the next client 105 request for accessing the back-end server 140.

Further note that although only two servers and certificates were used, the embodiments herein support any number of servers and certificates. According, the above embodiments may be used to obtain multiple certificates for acting on behalf of the user when communication between a multitude of servers. As such, the terms front-end and back-end server should be broadly construed to include any two servers within a forest.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIG. 2—is used to indicate the desired specific use of such terms.

Figure 2:
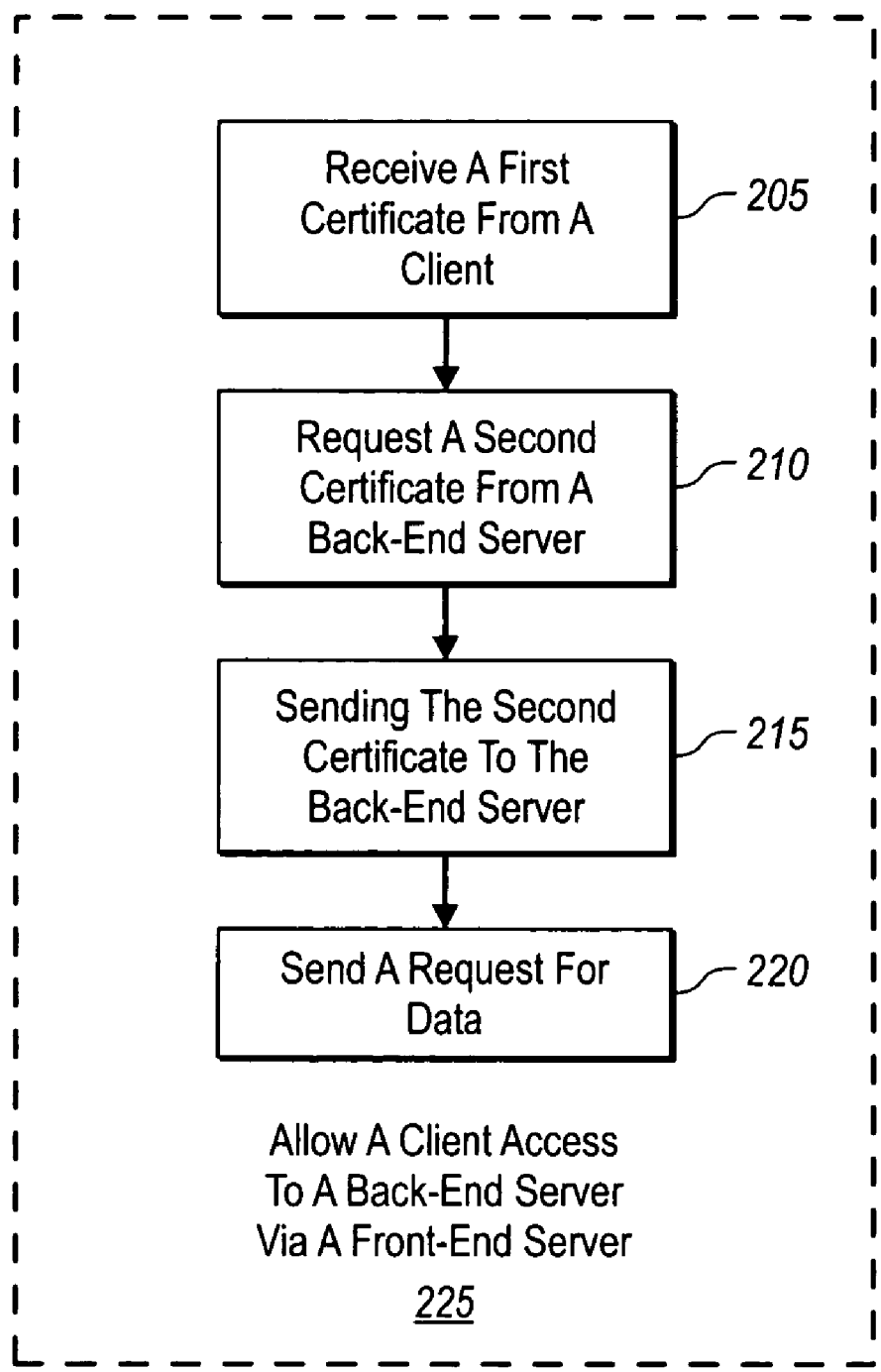
FIG. 2 illustrates a flow diagram of a method of authenticating a client to back-end server via front-end server in accordance with exemplary embodiments.

FIG. 2 illustrates flow diagrams for various exemplary embodiments of the present invention. The following description of FIG. 2 will occasionally refer to corresponding elements from FIG. 1. Although reference may be made to a specific element from this Figure, such elements are used for illustrative purposes only and are not meant to limit or otherwise narrow the scope of the present invention unless explicitly claimed.

FIG. 2 illustrates a flow diagram of a method 200 of authenticating a device to multiple servers without using delegation or having to have a password stored on the device. The method 200 uses multiple certificates that are typically non-delegable. Method 200 includes a step for allowing 225 a client access to a back-end server via a front-end server. Step for 225 includes and act of receiving 205 a first certificate from a client. For example, front-end server 110 may receive a first certificate 115 from a client devise 105 and pass the first certificate 115 to certificate authority 130 for authenticating the client 105 to the front-end server 110. Upon validating the client 105, the certificate authority 130 maps it to the client account and sends the front-end server 110 an authentication token establishing the authenticity of the client 105.

Upon authenticating the client to the front-end server, step for 225 includes and act of requesting 210 a second certificate from a back-end server. For example, front-end server 110 upon receiving the token, may use the token to locate the appropriate account for the client 105. The front-end server 110 then requests 120 a second certificate 125 by, e.g., logging on as a system administrator and locating the second certificate 125 in a predefined location (e.g., user's account) on the back-end server 140. In an example embodiment, the predefined location or account may be a user's mailbox.

Upon receiving a request 120 for the second certificate 125 from the front-end server, back-end server 140 sends second certificate 125 to the front-end server 110. Accordingly, upon receiving the second certificate step for 225 further includes an act of sending 215 the second certificate back to the back-end server. In other words, upon receiving the second certificate 125 the front-end server 110 logs off as an administrator, and sends the second certificate 125 back to the back-end server 140 to authenticate the front-end server 110 as the client 105. Upon authenticating the front-end server as the client to the back-end server, step for 225 also includes an act of sending 220 a request for data. For example, front-end server 140 can send the second certificate 125 to the certificate authority 130. Upon validating the second certificate 125, certificate authority 130 may send an authentication token back to the back-end server 140. This token may then be mapped to the client 105 using a client account, e.g., the client's mailbox. Authorization is then given to the client via the front-end server to access the appropriate data.

Note that typically embodiments describing the client device 105 are typically directed toward mobile devices such as a telephone, PDA, laptop computer, or the like. The present invention, however, is not limited to such devices and therefore the use of a mobile device as the client 105 is used herein for illustrative purposes only and is not meant to limit or otherwise narrow the scope of the present invention unless explicitly claimed.

Further note, that in order to combat some of the latency issues in the requesting and authenticating of the second certificate 125, other exemplary embodiments provide for a caching mechanism of the second certificate 125. In the event that the second certificate 125 is only valid for a predetermined period of time, other exemplary embodiments, as previously described, allow for determining the expiration of the second certificate 125. Upon determining the second certificate 125 is no longer valid, the second certificate 125 may be deleted 150 from the cache 145 of the front-end server 110. An updated second certificate 125 may then be requested 120 from the back-end server 140 as previously described. Upon receiving the updated second certificate 125, the front-end server 110 can cache the updated second certificate 125 in data store 145 for subsequently authenticating the client 105 to the back-end server 140 for future access.

We claim:

1. In a distributed computing system, a method of authenticating a client to multiple servers without using delegation or having to have a password stored on the client by using multiple certificates that are typically non-delegable, the method comprising acts of:
   receiving, at a front-end server, a first certificate from a client for authenticating the client to the front-end server;
   upon authenticating the client to the front-end server, the front-end server logging in to the back-end server using an administrative login procedure to request a second certificate from the back-end server in order to access data on behalf of the client, the second certificate corresponding to the client and being used to authenticate the client to the back-end server;
   upon receiving the second certificate, sending the second certificate back to the back-end server to authenticate the front-end server on behalf of the client to the back-end server such that the second certificate is used to authenticate the client to the back-end server; and
   upon authenticating the front-end server on behalf of the client to the back-end server, sending a request on behalf of the client for the data on the back-end server in order to allow the client access to the data on the back-end server via the front-end server.

2. The method of claim 1, wherein a mapping is used to map between the client authenticated against the front-end and the second certificate on the back-end.

3. The method of claim 1, wherein the front-end and back-end servers are email servers, and wherein the second certificate is stored on the back-end server in a predefined location of the client's mailbox.

4. The method of claim 1, wherein the second certificate is cached on the front-end server for future access.

5. The method of claim 4, wherein the first certificate, second certificate, or both, are valid for a predetermined limited period of time.

6. The method of claim 5, wherein after the expiration of validity of the second certificate, the method further comprises:
   deleting the second certificate from the cache;
   requesting an updated second certificate from the back-end server in order to access data on behalf of the client; and
   upon receiving the updated second certificate, caching the updated certificate for authenticating the client to the back-end server for future access to the back-end server.

7. In a distributed computing system, a method of authenticating a client to multiple servers without using delegation or having to have a password stored on the client by using multiple certificates that are typically non-delegable, the method comprising a step for:
   a front-end server receiving a first certificate from a client to authenticate the client to the front-end server;
   the front-end server sending the first certificate to a certificate authority for validation;
   the front-end server receiving a first authentication token indicating that the client has been validated to the front-end server;
   the front-end server using the first authentication token to locate a second certificate that is stored in the client's mailbox on a backend server, the second certificate corresponding to the client and being used to authenticate the client to the back-end server;
   the front-end server requesting the second certificate from the back-end server by logging in to the back-end server using an administrative login procedure;
   after receiving the second certificate, the front-end server sending the second certificate to the back-end server to authenticate the front-end server on behalf of the client to the back-end server such that the second certificate is used to authenticate the client to the back-end server;
   the back-end server sending the second certificate to the certificate authority for validation; and
   the back-end server receiving a second authentication token indicating that the front-end server has been validated on behalf of the client to the back-end server such that the front-end server can act on behalf of the client in retrieving data requested by the client from the back-end server.

8. The method of claim 7, wherein the back-end server is a mailbox server.

9. The method of claim 7, wherein a mapping is used to map between the client authenticated against the front-end and the second certificate on the back-end.

10. The method of claim 7, wherein the second certificate is cached on the front-end server for future access.

11. The method of claim 10, wherein the first certificate, second certificate, or both, are valid for a predetermined limited period of time.

12. The method of claim 11, wherein after the expiration of validity of the second certificate, the method further comprises:
    deleting the second certificate from the cache;
    requesting an updated second certificate from the back-end server in order to access data on behalf of the client;
    upon receiving the updated second certificate, caching the updated certificate for authenticating the client to the back-end server for future access to the back-end server.

13. In a distributed computing system, a computer program product for implementing a method of authenticating a client to multiple servers without using delegation or having to have a password stored on the client by using multiple certificates that are typically non-delegable, the computer program product comprising one or more computer storage media having stored thereon computer executable instructions that, when executed by a processor, cause the managed computing system to perform the following:
    receive, at a front-end server, a first certificate from a client for authenticating the client to the front-end server;
    upon authenticating the client to the front-end server, the front-end server logging in to the back-end server using an administrative login procedure to request a second certificate from the back-end server in order to access data on behalf of the client, the second certificate corresponding to the client and being used to authenticate the client to the back-end server;

upon receiving the second certificate, send the second certificate back to the back-end server to authenticate the front-end server on behalf of the client to the back-end server such that the second certificate is used to authenticate the client to the back-end server; and upon authenticating the front-end server on behalf of the client to the back-end server, send a request on behalf of the client for the data on the back-end server in order to allow the client access to the data on the back-end server via the front-end server.

14. The computer program product of claim 13, wherein a mapping is used to map between the client authenticated against the front-end and the second certificate on the back-end.

15. The computer program product of claim 13, wherein the client is a mobile device.

16. The computer program product of claim 13, wherein the first and second certificates are one of Kerberos or X.509.

17. The computer program product of claim 13, wherein the second certificate is cached on the front-end server for future access.

18. The computer program product of claim 13, wherein the first and second certificates are validated by a central authority for front-end server, the back-end server, or both.

* * * * *